United States Patent
Kumazaki et al.

(10) Patent No.: US 7,205,884 B2
(45) Date of Patent: Apr. 17, 2007

(54) VEHICLE ELECTRONIC KEY SYSTEM

(75) Inventors: Takeshi Kumazaki, Okazaki (JP); Toshio Shimomura, Chiryu (JP)

(73) Assignee: Denso Corporation, Kariya (JP)

( * ) Notice: Subject to any disclaimer, the term of this patent is extended or adjusted under 35 U.S.C. 154(b) by 509 days.

(21) Appl. No.: 10/730,091

(22) Filed: Dec. 9, 2003

(65) Prior Publication Data

US 2004/0119628 A1 Jun. 24, 2004

(30) Foreign Application Priority Data

Dec. 19, 2002 (JP) ............................. 2002-368911

(51) Int. Cl.
*H04Q 1/00* (2006.01)
(52) U.S. Cl. ..................... 340/5.61; 340/5.73; 341/176
(58) Field of Classification Search .............. 340/5.61, 340/5.72, 426.22, 426.23, 426.28
See application file for complete search history.

(56) References Cited

U.S. PATENT DOCUMENTS 6,552,649 B1 * 4/2003 Okada et al. ............. 340/5.61
6,670,883 B1 * 12/2003 Asakura et al. ........... 340/5.61
6,724,322 B2 * 4/2004 Tang et al. ................ 340/989
7,049,940 B2 * 5/2006 Ieda et al. ............... 340/425.5

FOREIGN PATENT DOCUMENTS

| JP | A-H07-125535 | 5/1995 |
| JP | A-H09-21258 | 1/1997 |
| JP | A-2000-248801 | 9/2000 |
| JP | A-2002-247656 | 8/2002 |

OTHER PUBLICATIONS

Denso Technology Control Dept., "Operation manual of a new model vehicle", *Toyota CELSIOR,*, Aug. 2000, pp.1-8 (Discussed in page 1 of the spec.).

* cited by examiner

*Primary Examiner*—Brian Zimmerman
(74) *Attorney, Agent, or Firm*—Posz Law Group, PLC

(57) ABSTRACT

An electronic key system has a mobile unit and a vehicle unit. Lamps are disposed in each door handles of doors. The lamps light in different modes in accordance with states of doors, which include a locked state, an unlock-standby state, and an unlocked state. Accordingly, a user having the mobile unit can easily recognize the states of the doors when the user approaches the doors.

9 Claims, 3 Drawing Sheets

| STATE OF DOOR 11 | UNLOCK | LOCK STANDBY | LOCK | |
|---|---|---|---|---|
| TRANSITIONAL CONDITION | | ENGINE SW:OFF DOOR:OPEN →CLOSE ID CODE:OK | DOOR SWITCH:ON | TIME ELAPSES |
| STATE OF LAMP 614 | OFF | BLINK WITH GREEN | LIGHT WITH RED | OFF |
| STATE OF OTHER DOORS | UNLOCK | | LOCK | |
| STATE OF OTHER LAMPS | OFF | LIGHT WITH GREEN | LIGHT WITH RED | OFF |

FIG. 3A

| STATE OF DOOR 11 | LOCK | UNLOCK STANDBY | UNLOCK | |
|---|---|---|---|---|
| TRANSITIONAL CONDITION | | ID CODE:OK | DOOR IS TOUCHED | TIME ELAPSES OR ENGINE IS STARTED | |
| STATE OF LAMP 614 | OFF | BLINK WITH RED | LIGHT WITH GREEN | OFF |
| STATE OF OTHER DOORS | LOCK | LOCK | UNLOCK | UNLOCK |
| STATE OF OTHER LAMPS | OFF | LIGHT WITH RED | LIGHT WITH GREEN | OFF |

FIG. 3B

| STATE OF DOOR | UNLOCK | UNLOCK | LOCK | |
|---|---|---|---|---|
| TRANSITIONAL CONDITION | | ENGINE SW:OFF AND DOOR:OPEN →CLOSE | ID CODE:OK AND DOOR SWITCH:ON | TIME ELAPSES | |
| STATE OF LAMP | OFF | BLINK WITH GREEN | LIGHT WITH RED | OFF |

VEHICLE ELECTRONIC KEY SYSTEM

CROSS REFERENCE TO RELATED APPLICATIONS

This application is based on Japanese Patent Application No. 2002-368911 filed on Dec. 19, 2002, the contents of which are incorporated herein by reference.

BACKGROUND OF THE INVENTION

1. Field of the Invention

The present invention relates to a vehicle electronic key system that controls a state of doors of a vehicle, such as a locked state and an unlocked state, based on a communication between a mobile unit and a vehicle unit.

2. Description of Related Art

A vehicle electronic key system is disclosed in an operation manual of a new model vehicle, which is published in Aug. 2000. The vehicle electronic key system includes a mobile unit having an electronic key and a vehicle unit. The vehicle electronic key system controls a state of doors of vehicles, such as a locked state and an unlocked state. The state of the doors is controlled based on a check result of an ID code of the mobile unit by communication between the mobile unit and the vehicle unit. The electronic key system also unlocks a steering lock and permits to start an engine when a user having the mobile unit is within a vehicle compartment.

In such an electronic key system, predetermined detection areas are formed inside and outside the vehicle. The vehicle unit transmits an interrogational signal at a predetermined time interval toward the detection areas. The electronic key system always monitors an approach of a user having the mobile unit, a ride on the vehicle, and getting out of the vehicle based on a response from the mobile unit in response to the interrogational signal.

In detail, when the user having the mobile unit approaches the vehicle to ride on the vehicle and then the user enters into the detection area, the mobile unit transmits an ID code to a receiver of the vehicle in response to the interrogational signal. The ID code transmitted from the mobile unit is checked in the vehicle unit whether the ID code corresponds to a registered ID code of the vehicle unit. When the ID code of the mobile unit corresponds to the registered ID code, a control unit of the vehicle unit sets doors to an unlock-standby state. Then, when the user having the mobile unit touches one of the doors in the unlock-standby state, the doors are unlocked in response to a detection of the touch via a touch sensor.

On the other hand, when the user having the mobile unit gets out of the vehicle after the engine is stopped, the detection area is shifted from the inside of the vehicle to the outside of the vehicle. When a door lock switch that is disposed near the door handle is operated when the detection area is formed outside the vehicle, the doors are locked.

In such a vehicle electronic key system, the user having the mobile unit can lock and unlock the doors without holding the mobile unit in hands. This improves convenience of the user.

However, the user cannot easily recognize the state of the door, such as the locked state, the unlocked state, and the unlock-standby state. For example, when the user having the mobile unit approaches the vehicle and then the user touches the door handle, the door is unlocked. However, the user cannot recognize that the door is in the unlock-standby state until the user touches the door handle. In addition, the user cannot easily check the unlocked state of the doors when the user operates the door lock switch.

SUMMARY OF THE INVENTION

In view of the foregoing situation, it is an object of the present invention to provide an electronic key system in which a user having a mobile unit can easily check a state of doors when doors of a vehicle is controlled by a communication between a mobile unit and a vehicle unit.

According to one aspect of the present invention, the electronic key system has a transmitter, a receiver, a controller, and an indicator. The controller controls a state of a door of a vehicle based on a check result of a relation between a code signal from a mobile unit and a memorized signal of the vehicle unit. The indicator is disposed on the vehicle, and indicates the state of the door. Accordingly, a user having the mobile unit can recognize the state of the door based on the indication of the indicator when the user approaches the door.

According to another aspect of the present invention, the electronic key system for a vehicle that has a first door and a second door includes a transmitter, a receiver, verification means, determination means, control means, a first indicator, and a second indicator. The control means controls states of the first door and the second door based on a verification of the verification means and a determination of the determination means. The control means controls the first indicator and the second indicator so that the first indicator and the second indicator indicate in different modes when the state of the first door is different from the state of the second door. Accordingly, a user can easily recognize the states of the doors because the first and second indicators indicate in the different mode when the states of the first door and the second door are different from each other.

BRIEF DESCRIPTION OF THE DRAWINGS

The above and other objects, features and advantages of the present invention will become more apparent from the following detailed description made with reference to the accompanying drawings. In the drawings:

FIG. 3A is a state transition diagram when a user having a mobile unit rides into a vehicle according to the present invention;

FIG. 3B is a state transition diagram when the user gets out of the vehicle according to the present invention.

DETAILED DESCRIPTION OF PREFERRED EMBODIMENTS

The preferred embodiments of the present invention will be explained with reference to the accompanying drawings.

Figure 1:
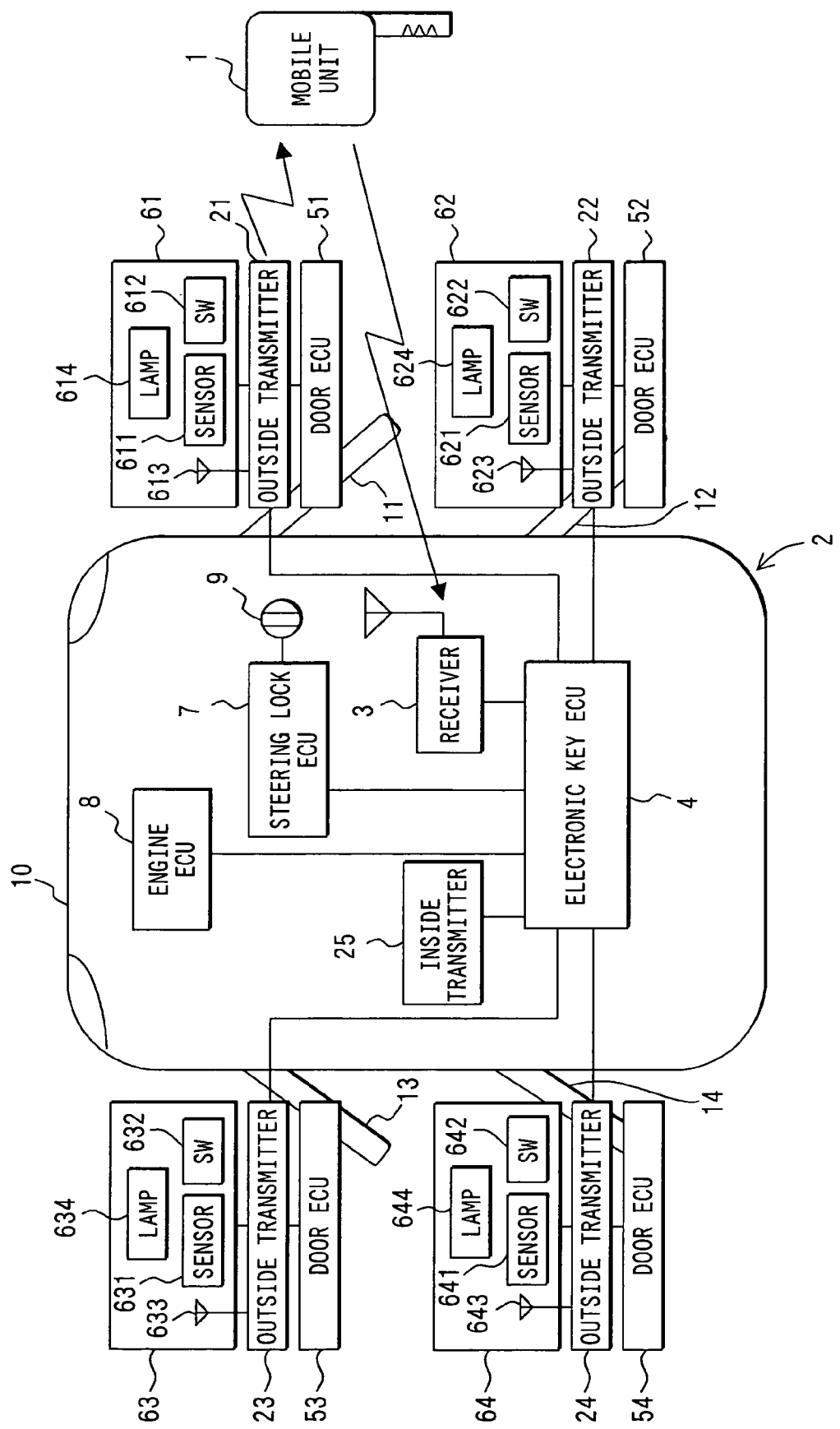
FIG. 1 is a schematic block diagram of an electronic key system according to the present invention.

As shown in FIG. 1, a vehicle electronic key system has a mobile unit 1 and a vehicle unit 2 in a vehicle 10. The mobile unit 1 is used as an electronic key instead of a mechanical key. The vehicle unit 2 has an electronic key ECU 4 as a control unit. The electronic key ECU 4 checks an ID code of the mobile unit 1 by communication with the mobile unit 1. The electronic key ECU 4 controls a locked state of doors 11 to 14 and a locked state of a steering of the vehicle based on the check result. The electronic key ECU 4 also controls permission and prohibition states of a start of an engine of the vehicle 10.

The vehicle unit 2 has a receiver 3, the electronic key ECU 4, and an inside transmitter 25 in a vehicle compartment of the vehicle 10. The vehicle unit 2 has an outside transmitter 21 and a door ECU 51 in the door 11. The vehicle unit 2 also has a touch sensor 611, a door lock switch 612, an antenna 613, and a lamp 614 in an outside door handle 61 of the door 11.

The vehicle unit 2 has outside transmitters 22, 23, 24 and door ECUs 52, 53, 54 in the respective doors 12, 13, 14 in the same manner as the door 11. The vehicle unit 2 has touch sensors 621, 631, 641, door lock switches 622, 632, 642, antennas 623, 633, 643, and lamps 624, 634, 644 in respective outside door handles 12, 13, 14 in the same manner as the outside door handle 11.

In the vehicle 10, as described above, the vehicle unit 2 has the outside transmitters 21–24 in the respective doors 11–14 and the inside transmitter 25 in the vehicle compartment. The outside transmitters 21–24 and the inside transmitter 25 transmit request signals (interrogatory signals) in response to a transmission signal from the electronic key ECU 4.

Each of the outside transmitters 21–24 transmits the request signal at a predetermined time interval when the vehicle is parked in a condition that the engine is stopped and the doors 11–14 are locked. Each of ranges in which the request signals can reach is set to a predetermined distance, for example, on the order of 0.7 meters to one (1) meter. As a result, when the vehicle is parked, outside detection areas are formed around the doors 11 to 14 in accordance with the ranges. The electronic key ECU 4 can immediately detect that a user having the mobile unit 1 approaches the vehicle 10 because the mobile unit 1 transmits an ID code signal when the mobile unit 1 detects the request signal.

The inside transmitter 25 provides an inside detection area within the vehicle compartment when driver's side door 11 is opened and closed, the engine is started, the doors 11–14 are locked by the door lock switches 612, 622, 632, 642, or the like. The electronic key ECU 4 detects whether the mobile unit 1 exists within the vehicle compartment based on the ID code signal from the mobile unit 1.

The mobile unit 1 has a transceiver. The transceiver receives the request signal from the outside transmitters 21–24 and the inside transmitter 25. The transceiver transmits the ID code signal in response to the request signal. As a result, when the mobile unit 1 enters within the outside and inside detection areas, the mobile unit 1 immediately receives the request signal and transmits the ID code signal. The ID code signal includes an ID code and a response code. The response code indicates one of the transmitters 21–25 from which the mobile unit 1 receives the request signal.

The receiver 3, which is disposed in the vehicle compartment, receives the ID code signal transmitted from the mobile unit 1. The receiver 3 outputs the ID code signal as a received signal to the electronic key ECU 4. The electronic key ECU 4 checks whether the ID code signal satisfies a predetermined relation. In detail, the electronic key ECU 4 checks whether the ID code signal corresponds to a registered ID code (authentication of the ID code).

The door ECUs 51–54 lock the respective doors 11–14, unlock the respective doors 11–14, and set the respective doors 11–14 in an unlock-standby state. The unlock-standby state is a condition that the doors 11–14 can be unlocked when the outside door handles 61–64 are touched by the user having the mobile unit 1 although the doors 11–14 are locked. The door ECUs 51–54 operate in response to an instruction signal from the electronic key ECU 4.

When the electronic key ECU 4 determines that the received ID code corresponds to the registered ID code (ID code: OK), the electronic key ECU 4 determines a location of the user having the mobile unit 1 based on the response code. When the electronic key ECU 4 determines that the user having the mobile unit 1 is located within the outside detection area, the electronic key ECU 4 provides the instruction signal to one of the corresponding door ECUs 51–54 so that one of the corresponding doors 11–14 becomes in the unlock-standby state. After that, one of the door ECUs 51–54 sets the corresponding doors 11–14 in the unlock-standby state in response to the instruction signal.

For example, when the user having the mobile unit 1 approaches the door 11, the door 11 becomes in the unlock-standby state. At the same time, the other doors 12–14 are maintained in the locked state.

The outside door handles 61–64 have the respective touch sensors 611, 621, 631, 641, the respective door lock switches 612, 622, 632, 642, the respective antennas 613, 623, 633, 643, and the respective lamps 614, 624, 634, 644. The touch sensors 611, 621, 631, 641 can detect whether the outside door handles 61–64 are touched by the user having the mobile unit 1 or not. The door lock switches 612, 622, 632, 642 have respective push button switches. The doors 11–14 are locked when corresponding door lock switches 612, 622, 632, 642 are operated in a condition that the authentication of the ID code is completed. The outside door handles 61–64 function as the antennas 613, 623, 633, 643 of the outside transmitters 21–24, respectively. Each of the lamps 614, 624, 634, 644 has a red light-emitting diode (LED) that illuminates in red and a green LED that illuminates in green.

The door ECUs 51–54 detect that the respective outside door handles 61–64 are touched by the user having the mobile unit 1 by means of the touch sensors 611, 621, 631, 641 in the unlock-standby state. The unlock-standby state is set by the door ECUs 51–54 in response to the instruction signal from the electronic key ECU 4. When one of the door ECUs 51–54 detects that one of the corresponding door handles 61–64 is touched by the user having the mobile unit 1, one of the door ECUs 51–54 sends the detection signal to the electronic key ECU 4. Then, the electronic key ECU 4 controls all door ECUs 51-54 so that all doors 11-14 are in the unlocked state. As a result, the doors 11–14 are automatically unlocked when the user having the mobile unit 1 tries to open the doors 11–14.

For example, when the door ECU 51 detects that the touch sensor 611 is touched in the condition that the door 11 is in the unlock-standby state, all doors 11–14 are unlocked. However, when the door 11 is in the unlock-standby state, the other doors 12–14 are stayed in the locked state. Accordingly, even if the touch sensors 621, 631, 641 are touched by a passenger that does not have the mobile unit 1, the doors 11–14 are not unlocked.

Instead of the touch sensors 611, 621, 631, and 641, another detection unit may be used for detecting an operation for opening the doors 11–14. For example, a mechanical device and an unlock button can be used. The mechanical device mechanically detects that the door handles 61–64 are pulled toward the user. The unlock button is disposed on the door handles 61–64, and the operation for opening the doors 11–14 may be detected when the unlock button is operated.

The vehicle electronic key system has a steering lock ECU 7 and an engine ECU 8 to improve a security of the vehicle 10. The steering lock ECU 7 locks or unlocks a steering lock in response to the instruction signal from the electronic key ECU 4. The engine ECU 8 controls the permission and prohibition of the engine start in response to the instruction signal from the electronic key ECU 4.

When the user having the mobile unit 1 rides into the vehicle 10 by opening and closing one of the doors 11–14, the electronic key ECU 4 communicates with the mobile unit 1 via the inside transmitter 25 and the receiver 3. The electronic key ECU 4 checks again the ID code by the communication.

An engine switch 9 is provided in the vehicle 10. When the engine switch 9 is operated by the user, the steering lock ECU 7 asks to the electronic key ECU 4 whether the steering lock ECU 7 may unlock the steering lock. When the check result of the ID code is O.K., the electronic key ECU 4 replies to the steering lock ECU 7 so that the steering lock ECU 7 can unlock the steering lock. The steering lock ECU 7 unlocks the steering lock in response to the reply. At the same time, the electronic key ECU 4 outputs an instruction signal to the engine ECU 8 so that the engine ECU 8 cancels the prohibition state of the engine start. As a result, the user having the mobile unit 1 can perform from the riding on the vehicle by unlocking the doors 11–14 to the starting the engine without holding the mobile unit 1 in hands.

On the other hands, the electronic key ECU 4 can detect a certain condition. The certain condition includes that the vehicle 10 is parked, the user with the mobile unit 1 gets out of the vehicle 10 after the engine switch 9 is turned off, and at least one of the door lock switches 612, 622, 632, 642 is operated. When the electronic key ECU 4 detects such a condition, the electronic key ECU 4 outputs another instruction signal to the door ECUs 51–54 so as to lock the doors 11–14, respectively. At the same time, the electronic key ECU 4 outputs another instruction signal to the engine ECU 8 so as to set the engine in the prohibition state of the engine start.

Another device may be used instead of the door lock switches 612, 622, 632, 642. For example, touch sensors are used for detecting the door lock operation by the user.

In such an electronic key system, when the user just has the mobile unit 1, the doors 11–14 can be automatically locked and unlocked, and the security setting of the vehicle 10 can be automatically turned on and off.

Figures 2, 4:
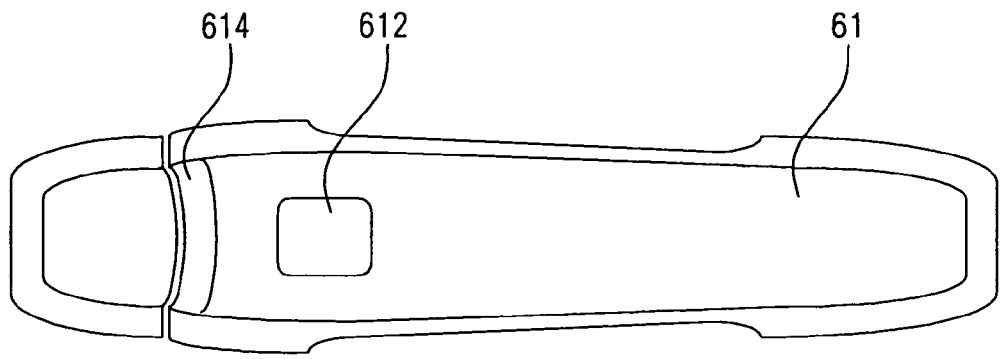
FIG. 2 is a front view showing a door handle according to the present invention.
FIG. 4 is another state transition diagram when the user gets out of the vehicle according to another embodiment of the present invention.

Next, the lamps 614, 624, 634, 644 disposed on the door handles 61–64 will be explained with FIG. 2. FIG. 2 shows a schematic front view of the door handle 61. Because the door handles 61–64 have the same structure, the door handle 61 will be explained.

As shown in FIG. 2, the door handle 61 has the door lock switch 612 and the lamp 614. The touch sensor 611 and the antenna 613 are disposed inside the door handle 61. The lamp 614 has a vertically oriented shape at one end of the door handle 61 so that the lamp 614 has approximately same length as a width of the door handle 61. The lamp 614 has the green LED that illuminates in green and the red LED that illuminates in red as described above. Since the lamp 614 is disposed on the door handle 61, the user can easily check the illumination state of the lamp 614 when the user having the mobile unit 1 approaches the door 11 of the vehicle 10 and the user leaves the door 11.

Next, a control of the illumination state of the lamps 614, 624, 634, 644 by the electronic key ECU 4 and the door ECU 51 will be explained with FIGS. 3A and 3B. As shown in FIG. 3A, the lamp 614 is turned off when the vehicle is parked and the doors 11–14 are locked. The lamps 614, 624, 634, 644 may be turned on to show the locked state of the doors 11–14 when the vehicle is parked and the doors 11–14 are locked. However, in such a case, electric current consumption of the lamps 614, 624, 634, 644 is increased. Accordingly, in this embodiment, the lamps 614, 624, 634, 644 are turned off when the vehicle is parked and the doors 11–14 are locked.

In such a situation, when the user having the mobile unit 1 approaches the vehicle 10 and enters into the detection area of the outside transmitter 21, the electronic key ECU 4 checks the ID code of the mobile unit 1 by the two-way communication with the mobile unit 1. As a result of the check, the door 11 is shifted from the locked state to the unlock-standby state when the check of the ID code is O.K. The unlock-standby state is the condition that the door 11 can be unlocked although the door 11 is locked. When the door 11 is shifted to the unlock-standby state, the lamp 614 starts to blink with red. The reason why the lamp 614 blinks with red is because the door 11 is still locked in the unlock-standby state and the user can distinguish between the unlock-standby state and the locked state.

When the door 11 is in the unlock-standby state, the other doors 12–14 are still maintained in the locked state. Therefore, the lamps 614, 624, 634, 644 start to light with red when the door 11 becomes in the unlock-standby state. As a result, the passenger, who does not have the mobile unit 1 and gets into the vehicle via the other doors 12–14, can easily recognize that the doors 12–14 are still in the locked state.

In addition, because the lamp 614 starts to blink when the user having the mobile unit 1 approaches the vehicle 10, the lamp 614 can impress the user so that the user is greeted by the lamp 614 with starting to blink.

When the door ECU 51 detects that the door handle 61 is touched by the user having the mobile unit 1 by means of the touch sensor 611 in the unlock-standby state of the door 11, the door ECU 51 unlocks the door 11 and changes the lamp state so that the lamp 614 lights in green. Since the lamp state of the lamp 614 is changed when the door 11 is shifted from the unlock-standby state to the unlocked state, the user can easily recognize the unlocked state of the door 11. The illumination color of the lamp 614 is changed from red to green when the door 11 is shifted from the locked state to the unlocked state. Accordingly, the user can clearly distinguish between the locked state and the unlocked state.

When the door 11 becomes in the unlocked state, the other doors 12–14 become in the unlocked state simultaneously and the lamps 614–644 start to light in green. As a result, the passenger can also easily recognize that the doors 12–14 are unlocked.

After that, the lamp 614 is turned off when a predetermined time period elapses after the door 11 of the vehicle 10 is unlocked and the lamp 614 starts to light in green or when the engine of the vehicle 10 is started. This is because it can be considered that it is unnecessary to light the lamp 614 from then because the user having the mobile unit 1 already rides into the vehicle 10.

In addition, when the user having the mobile unit 1 approaches one of the other doors 12–14, one of the doors 12–14 that detects the approach of the user operates in the same manner as the door 11.

As shown in FIG. 3B, when the engine switch 9 is turned off and the door 11 is closed after the door 11 is once opened when the user having the mobile unit 1 gets out of the vehicle 10, the lamp 614 starts to blink in green to indicate the unlock condition of the door 11. Since the lamp 614 starts to blink when the door 11 is closed after the user having the mobile unit 1 gets out of the vehicle 10, the lamp 614 can indicate the door state to the user and the electric current consumption of the lamp 614 can be decreased.

In addition, when the user having the mobile unit 1 gets out of the vehicle 10, the electronic key ECU 4 checks the ID code of the mobile unit 1 by the communication with the mobile unit 1 via the outside transmitter 21 and the receiver 3. When the check of the ID code is O.K. and the door lock switch 612 is operated by the user, the door 11 is shifted from the unlocked state to the locked state. At the same time, the lamp 614 changes the illumination state from the lighting in green to the lighting in red. As a result, since the lamp 614 changes the illumination state when the door 11 is shifted from the unlocked state to the locked state, the user having the mobile unit 1 can visually recognize that the door 11 is locked.

After that, the lamp 614 is turned off when a predetermined time period elapses after the door 11 of the vehicle 10 is locked and the lamp 614 starts to light in red.

In addition, the states of the other doors 12–14 and the lamps 624, 634, 644 are shifted in response to the shift of the states of the door 11 and the lamp 614. Accordingly, the passenger can also visually recognize the states of the doors 12–14.

In the electronic key system of the embodiment, the lamps 614, 624, 634, 644 are controlled so that the lamps 614, 624, 634, 644 light in accordance with the states of the respective doors 11–14, which include the locked state, the unlock-standby state, and the unlocked state. As a result, the user having the mobile unit 1 can immediately and visually recognize the states of the doors 11–14 of the vehicle 10 based on the illumination state of the lamps 614, 624, 634, 644.

The present invention should not be limited to the embodiment discussed above and shown in the figures, but may be implemented in various ways without departing from the spirit of the invention.

For example, in the embodiment, when the user gets out of the vehicle 10, the states of the all doors 11–14 and the states of the lamps 614, 624, 634, 644 are controlled in the same state as shown in FIG. 3B. However, the states of the door 11 and the lamp 614 can use different states from the other doors 12–14 and the other lamps 624, 634, 644.

In detail, as shown in FIG. 4, when the engine switch 9 is turned off and the door 11 is closed after the door 11 is once opened when the user having the mobile unit 1 gets out of the vehicle 10, the electronic key ECU 4 checks the ID code, which is received from the mobile unit 1 via the outside transmitters 21–24. At the same time, the electronic key ECU 4 checks which doors 11–14 are near the user having the mobile unit 1. Then, for example, when the user having the mobile unit 1 gets out of the vehicle 10 via the door 11, the lamp 614 of the door 11 starts to blink in green to indicate a lock-standby state of the door 11. The lock-standby state is a condition that the door 11 can be locked by means of the lock switch 612 although the door 11 is unlocked. When the lock switch 612 is operated in the lock-standby state of the door 11, all doors 11–14 are locked.

When the door 11 becomes in the lock-standby state, the other doors 12–14 are still in the unlock state, and therefore the other lamps 624, 634, 644 start to light in green. The reason why the lamps 624, 634, 644 light in green is because the user can easily distinguish the lock-standby state and the unlocked state.

Therefore, the user having the mobile unit 1 and the passenger can easily recognize the states of the doors 11–14 and distinguish one of the lock buttons 612, 622, 632, 644 to lock the doors 11–14.

In the embodiment, when the user having the mobile unit 1 approaches the vehicle 10, the door 11 is shifted to the unlock-standby state. After that, when the door ECU 51 detects that the door handle 61 are touched by the user, the doors 11–14 are unlocked. However, the doors 11–14 may be unlocked in a condition that the user having the mobile unit 1 just approaches the vehicle 10 and the check result of the ID code of the mobile unit 1 is O.K.

Similarly, when the user gets out of the vehicle 10, the doors 11–14 may be locked in a condition that the user having the mobile unit 1 just leaves the vehicle 10. In such a case, the lamp 614 starts to blink so that the lamp 614 indicates the unlocked state of the door 11 when the door 11 is closed after the user having the mobile unit 1 gets out of the vehicle 10. After that, when the user leaves the detection area of the outside transmitter 21, the doors 11–14 are locked and the illumination states of the lamps 614, 624, 634, 644 are changed to indicate the locked states of the doors 11–14.

In the embodiment, the lamp 614 lights in response to three different states of the door 11, which include the locked state, the unlock-standby state, and the unlocked state. However, the lamp 614 may further change the illumination state in response to another door state. For example, vehicles having automatic slide door increase in recent years. In such a vehicle, the lamp 614 may light in a manner that the lamp 614 indicates that the slide door automatically opens and closes when the slide door is automatically opened or closed.

In the embodiment, the lamp 614 indicates each state of the door 11. That is, the lamp 614 lights in red when the door 11 is locked, blinks in red when the door 11 is in the unlock-standby state, and lights in green when the door is unlocked. However, an illumination mode, such as the color of the light and the way of the light, may be modified in various ways.

In the embodiment, when the door ECU 51 detects that the touch sensor 611 is touched in the condition that the door 11 is in the unlock-standby state, all doors 11–14 are unlocked. However, the vehicle electronic key system may have another operation mode. In the operation mode, when the door ECU 51 detects that the touch sensor 611 is touched in the condition that the door 11 is in the unlock-standby state, only corresponding door 11 is unlocked and other doors 12–14 are not unlocked. In such an operation mode, the user having the mobile unit 1 and the passenger can easily recognize the states of the doors 11–14 because the each lamp 614, 624, 634, 644 can light independently.

In addition, when doors 11–14 are locked, each door 11–14 may be independently locked. In the embodiment, the states of the other doors 12–14 and the lamps 624, 634, 644 are shifted in response to the shift of the states of the door 11 and the lamp 614. However, the states of the other doors 12–14 and the lamps 624, 634, 644 may stay in the unlocked state even when the states of the door 11 and the lamp 614 are shifted. In such a situation, the user having the mobile unit 1 and the passenger can easily recognize the states of the doors 11–14 because the each lamp 614, 624, 634, 644 can light independently.

In addition, in the embodiment, the lamps 614, 624, 634, 644 are applied to the doors 11–14 for the vehicle compartment. Anther lamp may be applied to a luggage door. In such a case, a luggage lamp is disposed on the luggage door, and lights in response to a state of the luggage door.

In the embodiment, the lamps 614, 624, 634, 644 indicate a state of the doors 11–14. However, another device, such as a sound generator, may be used instead of the lamps 614, 624, 634, 644.

What is claimed is:

1. An electronic key system comprising:
a transmitter that transmits the interrogational signal to a mobile unit;
a receiver that receives a code signal transmitted from the mobile unit in response to the interrogational signal;
a controller that checks a relation between the code signal and a memorized signal, and controls a state of a door of a vehicle based on a check result of the relation;
an indicator that is disposed on the vehicle to indicate the state of the door; and
a detection means for detecting an opening operation of the door that is operated by a user having the mobile unit,
wherein the controller sets the door of the vehicle in an unlock-standby state when the code signal transmitted from the mobile unit is authenticated when the user having the mobile unit approaches the vehicle, and unlocks the door when the opening operation of the door is detected by the detection means in the unlock-standby state, and
the indicator starts to indicate the unlock-standby state of the door in a certain indication mode when the door becomes in the unlock-standby state, and the indicator changes the indication mode when the door is unlocked.

2. The electronic key system according to claim 1, wherein the indicator changes an indication mode between a first condition that the door is locked and a second condition that the door is unlocked.

3. The electronic key system according to claim 1, wherein the indicator is turned off when a certain time elapses or an engine of the vehicle is started.

4. The electronic key system according to claim 1, wherein the indicator starts to indicate that the door is unlocked when the door is closed after a user having the mobile unit gets out of the vehicle, and
the indicator changes an indication mode to indicate that the door is locked in response to a lock of the door after the door is closed.

5. The electronic key system according to claim 4, wherein the indicator is turned off when a certain time elapses.

6. The electronic key system according to claim 1, wherein the indicator indicates the state of the door when the state of the door is changed.

7. An electrical key system for a vehicle that has a first door and a second door, comprising:
a transmitter that transmits an interrogational signal to a mobile unit;
a receiver that receives a code signal that is transmitted from the mobile unit in response to the interrogational signal;
verification means for verifying the code signal against a memorized signal;
determination means for determining whether the mobile unit exists near the first door or near the second door when verification means verifies the code signal;
control means for controlling states of the first door and the second door based on the verification of the verification means and the determination of the determination means;
a first indicator that indicates the state of the first door;
a second indicator that indicates the state of the second door; and
a detection means for detecting an opening operation of at least one of the first door and the second door that is operated by a user having the mobile unit,
wherein the control means sets the at least one of the first door and the second door in an unlock-standby state when the code signal transmitted from the mobile unit is authenticated when the user having the mobile unit approaches the vehicle, and unlocks the at least one of the first door and the second door when the opening operation of the at least one of the first door and the second door is detected by the detection means in the unlock-standby state,
wherein the indicator starts to indicate the unlock-standby state of the at least one of the first door and the second door in a certain indication mode when the at least one of the first door and the second door becomes in the unlock-standby state, and the indicator changes the indication mode when the at least one of the first door and the second door is unlocked,
wherein the control means controls the first indicator and the second indicator so that the first indicator and the second indicator indicate in different modes when the state of the first door is different from the state of the second door.

8. The electronic key system according to claim 7, wherein when the determination means determines that the mobile unit exists near the first door, the control means controls the first door so that the state of the first door is shifted from a locked state to an unlock-standby state and controls the second door so that the state of the second door is maintained in the locked state, the first indicator indicates the unlock-standby state of the first door in a first mode, and the second indicator indicates the locked state of the second door in a second mode.

9. The electronic key system according to claim 7, wherein when the determination means determines that the mobile unit exists near the first door, the control means controls the first door so that the state of the first door is shifted from an unlocked state to a lock-standby stale and controls the second door so that the state of the second door is maintained in the unlocked state, the first indicator indicates the lock-standby state of the first door in a first mode, and the second indicator indicates the unlocked state of the second door in a second mode.

* * * * *